Aug. 18, 1936.     E. F. BEAVERSTOCK     2,051,239
SWITCH DEVICE
Original Filed Oct. 26, 1932
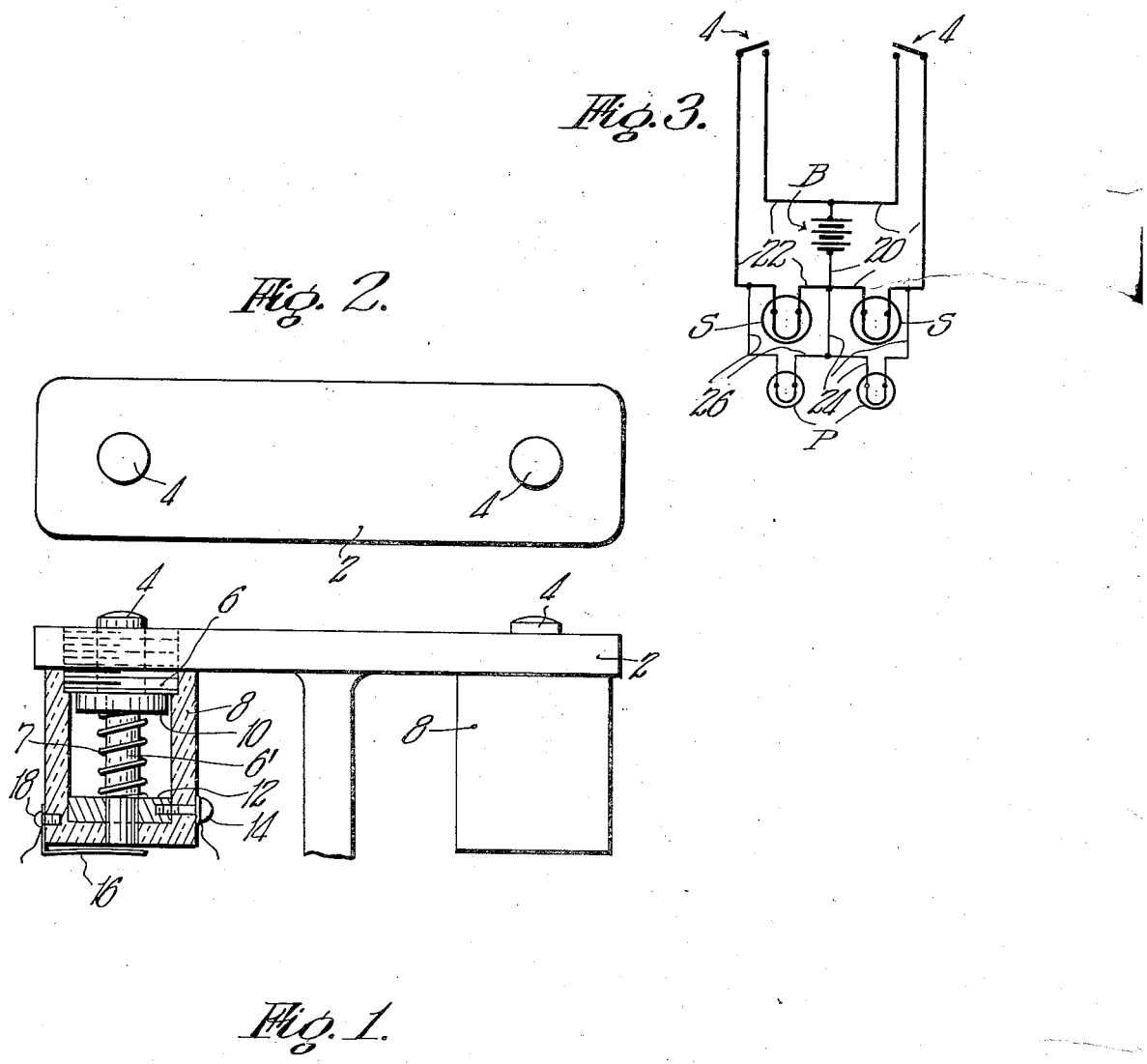
INVENTOR.
Elisha F. Beaverstock
BY
ATTORNEY.

Patented Aug. 18, 1936

2,051,239

UNITED STATES PATENT OFFICE 2,051,239

SWITCH DEVICE

Elisha F. Beaverstock, Holyoke, Mass.

Original application October 26, 1932, Serial No. 639,641, now Patent No. 2,008,166, dated July 16, 1935. Divided and this application June 17, 1935, Serial No. 26,892

1 Claim. (Cl. 200—59)

This invention relates to improvements in direction indicating apparatus for motor vehicles and is directed more particularly to a switch device associated with a foot pedal for a brake or the like. This application is a division of an application Serial No. 639,641, filed by me on October 26, 1932 now Patent No. 2,008,166, issued July 16, 1935.

The principal objects of the invention are directed to the provision of novel switch device associated with a pedal for a motor vehicle adapted and arranged whereby an operator may actuate the device by the foot used for pressing on and actuating the pedal and in this way signal devices may be operated by the switch device.

Various novel features and advantages of the invention will be hereinafter more fully referred to in connection with the accompanying description of the preferred form of the invention, reference being had to the accompanying drawing, wherein:

Fig. 1 is a side elevational view of a pedal having the switch device of the invention associated therewith.

Fig. 2 is a plan view of the pedal shown in Fig. 1, and

Fig. 3 is a wiring diagram to explain how the switch device may be associated with the signal circuit.

The invention in its broad aspects relates to switch devices adapted for association with a pedal such as the brake or clutch pedal of an automobile whereby signal devices may be operated and is useful for operating a direction indicator which may be located at the forward and/or the rear end of the vehicle. The indicator may be provided with separate lights behind signs indicating right or left so that when one of the lights is connected to a battery or the like the indicator will indicate a certain direction and pilot lights may be connected in parallelism with the lights mentioned and located on the dash so that the operator may know that the signal apparatus is functioning properly. The switch device of the invention will now be described.

2 represents the upper part of a pedal for a brake or clutch which is depressed by the foot of the operator to operate the brake or clutch.

A switch device is disposed adjacent opposite ends of the pedal and has a plunger 4 projecting above the upper side of the pedal so as to be engageable by the foot of the operator. A bushing 6 is in threaded engagement with opposite ends of the pedal 2 and has in screw threaded engagement with its lower end a shell member 8. Preferably the bushing 6 and shell 8 will be of non-conductive material.

The plunger 4 is slidable in the bushing and has a stem 6' on its lower end. A washer or collar 10 is associated with the plunger and stem and a washer 12 is disposed in the lower end of the shell and slidably receives the stem 6' of the plunger. A spring 7 is disposed between the members 10 and 12 and surrounds the stem 6'. This urges the stem and plunger upwardly so that the member 10 abuts the lower side of the bushing.

A screw 14 extends through a side of the shell 8 and is in threaded engagement with the member 12. To this screw may be secured a lead wire such as shown for connecting the member 12 and thereby the stem 6' to one side of a circuit. A contact member 16 is carried by the shell 8 and has a portion as shown disposed below the end of the stem 6'. As the plunger is depressed the plunger 6' thereof contacts with the contact member 16 so as to complete a circuit in which the contact 16 may be included.

In Fig. 3 there is shown a diagram to explain how the switch device or devices associated with a pedal may be connected to a signal apparatus having right and left hand signal lamps or indicators.

The signal devices or lamps are represented by by S and are connected by wires 20 and 22 to a source of energy such as a battery B. The switch devices are indicated at 4 and are arranged for opening and closing the separate circuits each including the battery B and one of the signal lamps S.

As the operator presses on one or the other of the plungers, one or the other of the circuits may be closed so that a particular lamp S is lighted. Pilot lamps indicated by P may be carried by the dash or in the driving compartment of an automobile and are connected by the wires 24 and 26 in parallelism with the signal lamps. As a signal lamp is lighted a pilot light corresponding to the particular signal lamp is also lighted and in that way the operator is able to see that the signal light is in operation.

Various changes and modifications may be made in the form of the invention without departing from the spirit and scope thereof and therefore I desire to be limited, if at all, by the appended claim rather than by the foregoing description.

What I claim is:

The combination of the pedal of an automobile with a circuit closing device comprising, a bushing of relatively non-conductive material screw-threaded in said pedal having a plunger bore therethrough and a threaded portion extending below the lower side of said pedal, a hollow shell having a wall at its lower end with its upper end threadedly engaging the threaded portion of the bushing, the lower wall of the shell being provided with a plunger bore, a plunger of conductive material slidable in the bores of the bushing and lower wall of the shell having a collar for abutting the lower side of said bushing, a washer of conductive material disposed on the lower wall of the shell in contact with the plunger, a spring between said washer and collar of the plunger, a yieldable contact member on the lower end of the shell extending transversely of the bore of the lower wall and engageable by the lower end of the plunger, and a connecting screw extending through the shell threadedly engaging said washer, all adapted and arranged whereby the upper end of the plunger is normally and yieldingly maintained in an operative position above the plane of the upper side of the bushing and pedal and is depressible against said spring to bring its lower end into contact with the contact member to close a circuit including said contact member, plunger and connecting screw.

ELISHA F. BEAVERSTOCK.